Figure 1:
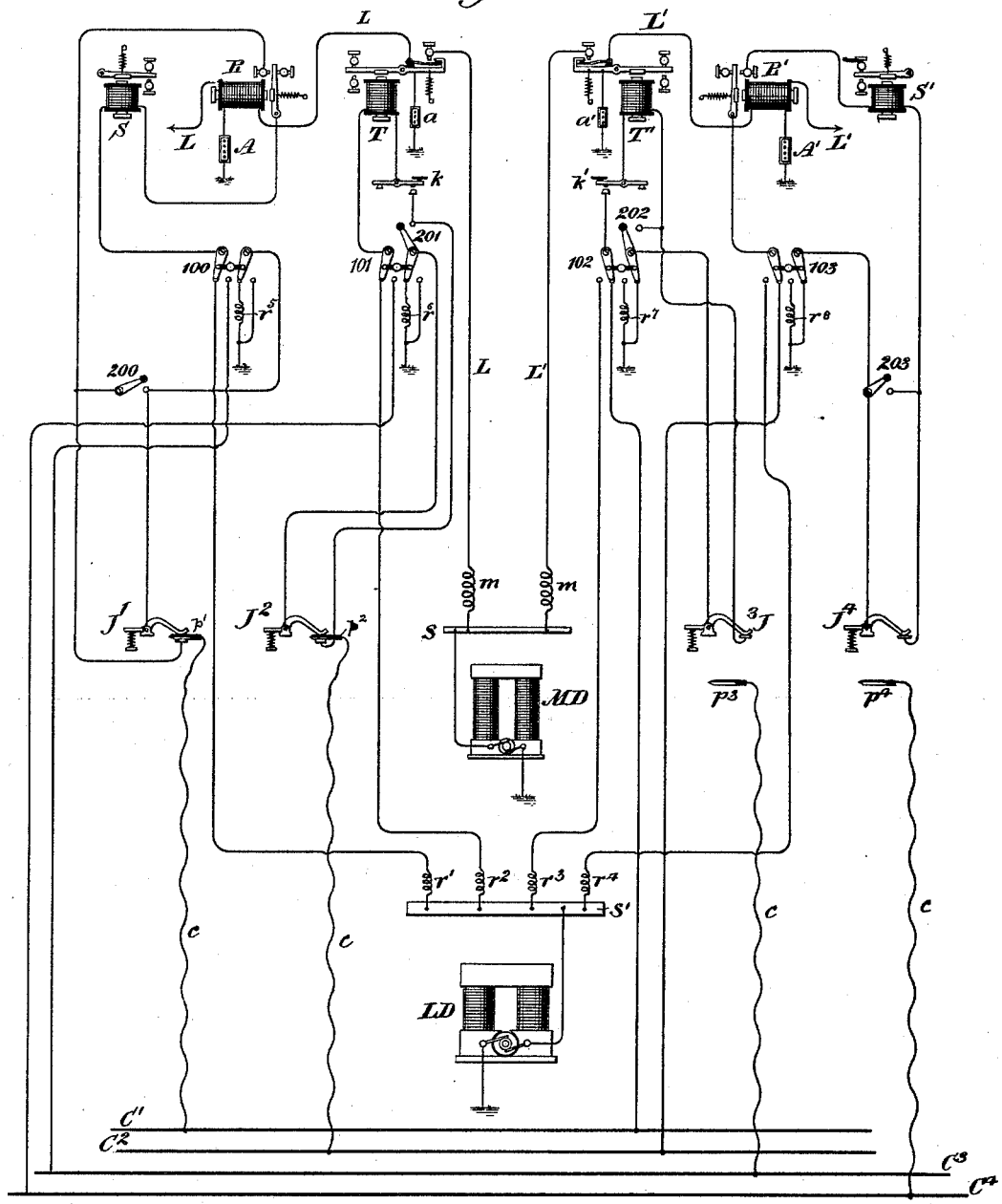

(No Model.) 2 Sheets—Sheet 1.

F. W. JONES.
ELECTRICAL CIRCUIT FOR TELEGRAPH APPARATUS.

No. 488,940. Patented Dec. 27, 1892.

(No Model.)  2 Sheets—Sheet 2.

F. W. JONES.
ELECTRICAL CIRCUIT FOR TELEGRAPH APPARATUS.

No. 488,940.  Patented Dec. 27, 1892.

WITNESSES:
E. P. Hopkins
W. C. Place

INVENTOR
Francis W. Jones
BY Wm. B. Vansize
ATTORNEY

UNITED STATES PATENT OFFICE.

FRANCIS W. JONES, OF NEW YORK, N. Y.

ELECTRICAL CIRCUIT FOR TELEGRAPH APPARATUS.

SPECIFICATION forming part of Letters Patent No. 488,940, dated December 27, 1892.

Application filed August 12, 1892. Serial No. 442,862. (No model.)

*To all whom it may concern:*

Be it known that I, FRANCIS W. JONES, a citizen of the United States, and a resident of the city of New York, in the county and State of New York, have invented certain new and useful Improvements in Electrical Circuits for Telegraph Apparatus, of which the following is a specification.

My invention is designed for use in a telegraph office where two or more separate circuits are employed, such circuits extending to widely separated points, and the object of the invention is to provide means for expeditiously connecting any two circuits together so that the stations at the distant end of the two separate circuits may be placed in direct communication with respect to each other and without the active intervention of an operator; in short, I want to arrange the main and local circuits so that one may repeat into the other, and I want to do this so that the resistance of the circuits will be preserved substantially uniform; in this case the strength of current will be maintained uniform and the adjustment of the instruments will never require changing so long as the electro motive force and internal resistance of the generators are unchanged. To insure this result I employ separate dynamo electric machines, each of proper electro motive force, one or more of said machines, of comparatively high electro motive force, being employed for the main circuits, and one or more of such machines, having a comparatively low electro motive force, being employed for the local circuits. In the normal condition of the local circuits at any given station there will be but one electro magnetic coil in a local circuit, in which circuit is also included a circuit breaker, which may be either manually operated as in the case of a transmitter, or operated by an electro magnet such as the local circuit points of a main line relay, as in the case of the sounder. Now, when we come to include two of these electro magnets in a circuit, of course the resistance would naturally be double; this would halve the current and necessitate the readjustment of the electro magnets in order to produce successful operation. It often occurs that instruments which it is thus desirable to connect in a single circuit are located at widely separated points, as is the case in the large operating rooms of the principal telegraph companies, such as those in New York City, and I have devised an arrangement by which an operator located at either instrument of any two which it is desired to connect into one circuit may complete the operation of thus uniting such instruments in one circuit, and I have also provided means whereby either operator may divide the circuit into two independent circuits, no matter whether initial union of the two circuits was produced at one instrument or the other. In order that the resistance may be maintained equal at all times whether there be but one electro magnet in a local circuit, as in the normal condition, or whether there be two in a single circuit as is the case when the circuits are connected for repeating purposes, I provide a series of separate artificial resistances each equal to the other and each equal to the resistance of an electro magnet; these resistances are compactly arranged and occupy but a small space, and I normally connect two such resistances with each local circuit, and I connect suitable switching apparatus in such a manner with respect to each local circuit that when said switches are operated to introduce a second electro magnet artificial resistances are removed from the circuits simultaneously with the introduction of the second electro magnet to such an extent that the resistance of the circuit is maintained uniform under all conditions.

Figure 2:
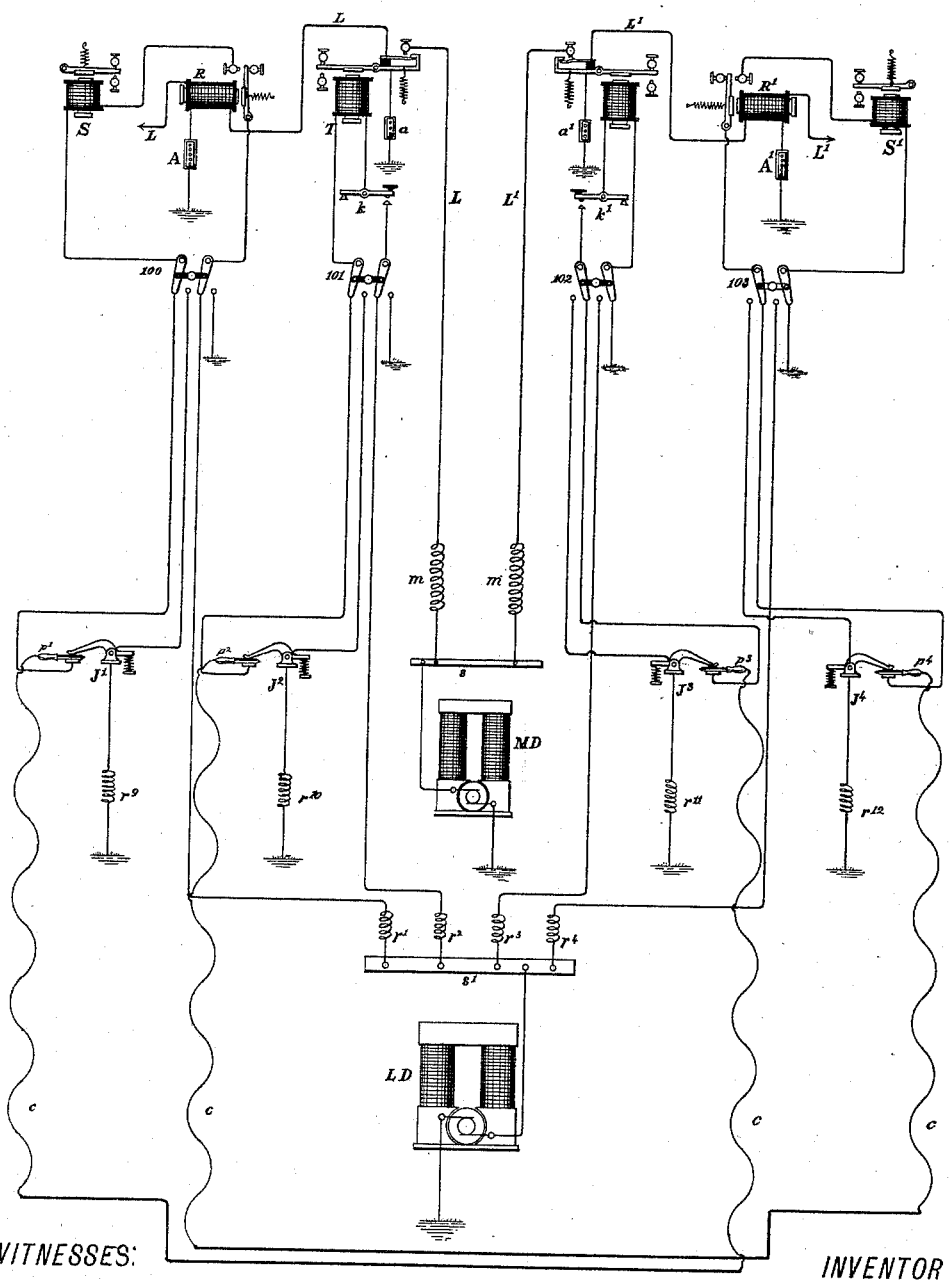

The accompanying drawings illustrate my invention:

Figure 1 is a complete schematic plan of the arrangement of circuits and apparatus, and Fig. 2 is a similar view showing modifications in the connections of a local circuit and of the switches with respect to the separate equivalent resistances.

L and L' are two main telegraph lines starting from a central point or station and extending thence to widely separated points. I have shown the ordinary and well known form of duplex telegraph instruments on each circuit, of course a quadruplex or a sextuplex or a single Morse instrument might be substituted for the duplex shown in the drawings. In this duplex set there is included the differential relay R R′, artificial resistance A A′, the artificial resistance $a$ $a'$, a transmitter T operated by a hand key $k$ $k'$, and there are sounders S S′ each in its own local circuit operated by the local circuit points of the relays R R′. The main lines L and L′ are supplied with electro motive force of say five hundred volts from a main dynamo M D, this dynamo is connected with a switch bar $s$ and there are artificial resistances $m$ in each line L and L′, these resistances $m$ are intended to render the resistances of the lines L and L′ substantially equal and uniform.

L D is a local dynamo supplying an electro motive force comparatively low, say six volts, and current of considerable volume. Dynamo L D is connected to the switch bar $s'$. There are four (4) point switches, 100, 101, 102 and 103 in each of the four local circuits shown in the drawings, and in each local circuit there is the ordinary form of spring jack, J′, $J^2$, $J^3$, $J^4$. In each local circuit there is a cut out switch 200, 201, 202 and 203, each of which, when operated, forms a short circuit for the jack J of its particular circuit. Switches 100 and 101 are in their normal position, and switches 102 and 103 have been changed so as to unite the circuits for repeating purposes. The local circuit of the relay R in line L may be traced as follows: From the ground or return circuit through the dynamo L D, the switch bar $s'$, a resistance $r'$ an electrical connection with the switch 100 through the coils of the sounder S and local circuit break points of the relay R, thence to the spring jack J′ to the switch 100 and resistance $r^5$ to ground; these resistances $r$ are of uniform size, let us assume them to be ten ohms each, and that the coils of the sounders S S′ and of the transmitters T T′ are also ten ohms each, there is then in this circuit that we have just traced, excluding the internal resistance of L D, three resistances, $r'$, S, $r^5$, of ten ohms each, or thirty ohms; the same is true of the circuit of the transmitter T as will be seen by tracing this circuit from the dynamo L D through resistance $r^2$, switch 101, transmitter T, key $k$, jack $J^2$, resistance $r^6$. Now in the normal position of the local circuits connected with the instruments on line L′ the artificial resistances are the same in number and disposition, and their total is the same in amount. The strength of current flowing in each local circuit would be approximately one fifth of an ampere, or two hundred millampères. Switch 100 is permanently connected with strip $C^3$, switch 101 is permanently connected with strip $C^4$, switch 102 is permanently connected with strip C′, switch 103 is permanently connected with strip $C^2$. Strip C′ is connected with jack plug $p'$ by a flexible cord $c$ located in proximity to jack J′, strip $C^2$ is connected with jack plug $p^2$ by flexible cord $c$ located in connection with jack $J^2$, conductor $C^3$ is connected with jack plug $p^3$ by cord $c$ located in proximity to jack $J^3$, conductor $C^4$ is connected with jack plug $p^4$ by cord $c$ located in proximity to jack $J^4$. Now, if it be desired to connect the two lines L and L′ so that they repeat into each other the transmitter T′ of the line L′ must be placed in the same local circuit with the sounder S of the line L and the sounder S′ of the line L′ must be placed in the same local circuit with the transmitter T of the line L. The switches 102 and 103 have been moved over from their normal position and it only remains to insert the plug $p'$ in the jack J′ and $p^2$ in the jack $J^2$ to complete the connection, this would be done at the point where the jacks are located, it might be the main switch board of the office or it might be at some special point—the location is not material. We will assume that the jacks are on the main switch board, and that the chief operator has properly manipulated the plugs and jacks in connection with the line L′; two new circuits will thus be formed and may be traced as follows: From the local dynamo L D through resistance $r'$, switch 100, sounder S, local break points of relay R to the fixed contact of jack J′, through plug $p'$ and cord $c$, strip C′ to switch 102, to key $k'$, transmitter T′, jack $J^3$, switch 102, to ground; total resistance in this circuit thirty ohms, composed of $r'$, S and T′. We will now trace the circuit of transmitter T and sounder S′: From dynamo L D through resistance $r^2$, switch 101, transmitter T, key $k$, fixed point of jack $J^2$, plug $p^2$, cord $c$, conductor $C^2$, switch 103, local points of relay R′, sounder coils S′, jack $J^4$, switch 103 to ground, total resistance in circuit thirty ohms, composed of the elements $r^2$, T, S′. The resistances $m$ in the lines L and L′ have not been changed and said lines maintain their normal resistance, while the resistance of the local circuits thus connected into one is also the same as in the normal condition, thirty ohms each, and the strength of current in each local circuit is two hundred miliampères. If now the operator sitting at the table in connection with line L desires for any purpose to cut off the repeating points of the second instrument he turns cut out switch 200 and 201, thus short circuiting the jacks J′ and $J^2$, and so far as he is concerned the instruments are separate and divided, and he can adjust his instrument without interference from the second or repeating instrument.

The modification shown in Fig. 2 varies the location of the artificial resistances $r$ so that said resistances are not all normally in the circuit; it will be noticed that there are two artificial resistances equivalent with respect to each other connected with each local circuit and but one of these two is normally in circuit, the other being employed only when the circuits are connected for repeating purposes. This is perhaps more economical, and may be found to be preferable under certain conditions, but I prefer the arrangement shown in Fig. 1.

The resistances $r^5$, $r^6$, $r^7$ and $r^8$ are connected to the moving contact of the spring jacks J′, $J^2$, $J^3$ and $J^4$ respectively; they are of the same resistance and are practically substituted in circuit for the resistances $r^5$, $r^6$, $r^7$ and $r^8$ shown in Fig. 1.

What I claim and desire to secure by Letters Patent is:

1. The combination in an electrical circuit at one station of a main dynamo electric machine; a main telegraph line connected thereto; relay coils in said line; a local dynamo electric machine having a comparatively low electro motive force; a local circuit including said dynamo machine; a circuit breaker and the coils of an electro magnet and having connected thereto two separate artificial resistances substantially equal to each other and to said magnet; a second main line supplied by a main dynamo having comparatively high electro motive force; relay coils in said line; a second local circuit supplied by a local dynamo; a local circuit including said dynamo; a circuit breaker and the coils of an electro magnet and having connected thereto two separate artificial resistances substantially equal to each other and to said electro magnet, and switching devices connected to said local circuits and with said resistances so arranged that the two electro magnet coils may be included in one common circuit, and an equivalent artificial resistance simultaneously excluded whereby the resistance of said circuits are preserved practically uniform, substantially as described.

2. The combination in electrical circuits at one station of a main electric generator; a main telegraph line connected thereto; an artificial resistance for said line; relay coils in said line; a local electric generator having a comparatively low electro motive force; one or more local circuits, each including said generator; a circuit breaker and the coils of an electro magnet and having connected thereto two separate artificial resistances substantially equivalent to each other and to said magnet; a second main line supplied by said main line generator; relay coils in said line; an artificial resistance for said line; two or more additional local circuits supplied by a local generator; local circuits including said generator; a circuit breaker and the coils of an electro magnet, each circuit having connected therewith two separate artificial resistances substantially equivalent to each other and to said electro magnet, and switching devices connected with said local circuits so arranged that two electro magnet coils may be included in one common circuit and an equivalent artificial resistance simultaneously excluded whereby the resistances of said circuits are preserved practically uniform, substantially as described.

3. The combination at one station of two telegraph lines; a dynamo electric machine of comparatively high electro motive force supplying current for said main lines; a main line relay in each main line; a local circuit for each of said relays; a dynamo electric machine of comparatively low electro motive force supplying current for said local circuits, each of said local circuits also including the break points of the relay, the coils of an electro magnet and one or more switching devices, and one or more artificial resistances, each substantially equivalent to the resistance of an electro magnet; one or more additional local circuits, each including the local dynamo, the coils of an electro magnet and switching devices and one or more artificial resistances each substantially equivalent to one of said electro magnets, said switching devices being so connected with respect to each other and the said local circuits that a change in the position of the switches of any two predetermined circuits operates to include the electro magnets of said two circuits into one single circuit and to simultaneously exclude an artificial resistance whereby the resistance of said united circuit is preserved uniform, substantially as described.

4. The combination of two normally separate local circuits, each circuit including a generator of electricity, two electro magnet coils one for each circuit, said coils having substantially the same resistance, a circuit breaker in each of said circuits, one or more artificial resistances connected with each of said circuits, and switching devices for each circuit electrically connected to said resistances, substantially as described, whereby the magnet coil of one circuit may be included in circuit with the magnet coil of the other circuit, and an equivalent artificial resistance, normally in circuit, may be excluded from said circuit, as and for the purpose hereinbefore set forth.

5. The combination of two normally separate local circuits each including a generator of electricity; two electro magnet coils, one for each circuit, said coils having substantially the same resistance, a circuit breaker in each of said circuits, one or more artificial resistances in each of said circuits, a four point switch for each of said circuits, and spring jacks and jack plugs for said circuits arranged substantially as described whereby the coil of one circuit may be included and the artificial resistance of the other circuit may be excluded from a circuit common to both coils.

6. The combination of two normally separate local circuits each including a generator of electricity, two electro magnet coils, one for each circuit, said coils having substantially the same resistance, a circuit breaker in each of said circuits, one or more artificial resistances in each of said circuits, a four point switch for each of said circuits, a spring jack plug and cord for each of said circuits and a cut out switch for each spring jack all connected and arranged substantially as and for the purpose described.

7. The combination of two normally separate local circuits each including an electric generator, an electro magnetic coil in each circuit, said coils having substantially the same resistance, a circuit breaker in each of said circuits, an artificial resistance in each of said circuits, each resistance in amount being substantially equivalent to one of said coils, and switching devices for each of said circuits arranged substantially as described whereby a common circuit may be established including both magnet coils and excluding artificial resistance in amount equal to the added coil, as and for the purpose set forth.

8. The combination in a local circuit of a generator of electricity, the circuit breaker of a telegraphic instrument, an electro magnetic coil, and two separate artificial resistances each substantially equivalent to the resistance of said coil, a second electro magnetic coil of substantially the same resistance as the first named coil and a switching device operating to substitute the second named electro magnetic coil for one of said artificial resistances, whereby the resistance of the circuit remains practically unchanged, substantially as described.

9. The combination of a main line telegraph instrument and a local circuit therefor, including a generator of electricity, a circuit breaker, an electro magnet coil, two separate artificial resistances substantially equal to each other and to the said coil and a switch for varying the position of one of said artificial resistances with respect to said circuit, substantially as described.

FRANCIS W. JONES.

Witnesses:
WM. H. BAKER,
JOHN DORAN.